US012148588B2

(12) United States Patent
Ikeda

(10) Patent No.: US 12,148,588 B2
(45) Date of Patent: Nov. 19, 2024

(54) METHOD OF CONTROLLING ELECTROMAGNETIC RELAY, AND CONTROL APPARATUS

(71) Applicant: SUBARU CORPORATION, Tokyo (JP)

(72) Inventor: Shunsuke Ikeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 293 days.

(21) Appl. No.: 17/886,796

(22) Filed: Aug. 12, 2022

(65) Prior Publication Data

US 2023/0083969 A1 Mar. 16, 2023

(30) Foreign Application Priority Data

Sep. 14, 2021 (JP) ................................ 2021-149605

(51) Int. Cl.
*H01H 47/22* (2006.01)
*H01H 50/14* (2006.01)
*H01H 50/44* (2006.01)

(52) U.S. Cl.
CPC ............ *H01H 47/22* (2013.01); *H01H 50/14* (2013.01); *H01H 50/44* (2013.01)

(58) Field of Classification Search
CPC ........ H01H 47/22; H01H 50/14; H01H 50/44; H01H 2011/0068; H01H 11/0062; H01H 47/002
USPC ........................................................ 361/160
See application file for complete search history.

(56) References Cited

U.S. PATENT DOCUMENTS

2019/0080868 A1* 3/2019 Riley ..................... H01H 50/54
2020/0411265 A1* 12/2020 Fujita .................... H02J 7/0068
2022/0130629 A1* 4/2022 Hirayama ............. H01H 45/12

FOREIGN PATENT DOCUMENTS

JP 2007165406 A * 6/2007
KR 20190029888 A * 11/2022

* cited by examiner

*Primary Examiner* — Thienvu V Tran
*Assistant Examiner* — Sreeya Sreevatsa
(74) *Attorney, Agent, or Firm* — MCGINN I.P. LAW GROUP, PLLC.

(57) ABSTRACT

A method of controlling an electromagnetic relay includes supplying a first voltage to an exciting coil to bring a movable terminal into contact with a fixing terminal; causing a coupling state determination unit to determine that a coupling failure is detected in a case where the movable terminal is not brought into contact with the fixing terminal and the electromagnetic relay is not turned on despite the supplying the first voltage to the exciting coil; and supplying a second voltage higher than the first voltage from a booster circuit to the exciting coil in a case where the coupling state determination unit determines that the coupling failure is detected. The second voltage is generated by boosting the first voltage by the booster circuit.

6 Claims, 4 Drawing Sheets

METHOD OF CONTROLLING ELECTROMAGNETIC RELAY, AND CONTROL APPARATUS

CROSS-REFERENCE TO RELATED APPLICATIONS

The present application claims priority from Japanese Patent Application No. 2021-149605 filed on Sep. 14, 2021, the entire contents of which are hereby incorporated by reference.

BACKGROUND

The technology relates to a method of controlling an electromagnetic relay, and a control apparatus, in particular, to a method of controlling an electromagnetic relay to eliminate a contact conduction failure, and a control apparatus that eliminates the contact conduction failure.

Electromagnetic relays have been widely used as switching means for supplying electric power to apparatuses, devices, and other components to activate, for example, electronic devices, power apparatuses, or vehicles. The electromagnetic relay includes, for example, a fixing terminal for coupling circuitry, a movable terminal, and an exciting coil for moving the movable terminal. The electromagnetic relay is configured to couple the circuitry, e.g., couple a power source to an electric load by supplying a voltage to the exciting coil to bring the movable terminal into contact with the fixing terminal.

Inside the electromagnetic relay having such a configuration, water vapor is generated when the exciting coil is heated, and the water vapor is condensed into ice particles on the terminals when an ambient temperature drops below freezing. These ice particles can cause a conduction failure at contacts between the terminals. The conduction failure can be caused also by obstacles, such as dust, attached to the contacts between the terminals.

An electromagnetic relay disclosed in Japanese Unexamined Patent Application Publication (JP-A) No. 2007-165406 includes a vibration generating means for vibrating a housing of the electromagnetic relay or a frozen portion inside the housing. In a case where it is determined that a portion inside the housing of the electromagnetic relay is frozen, the vibration generated by the vibration generating means is transmitted to the fixing terminal and other components to remove the frozen portion.

SUMMARY

An aspect of the technology provides a method of controlling an electromagnetic relay. The method includes: supplying a first voltage to an exciting coil to bring a movable terminal into contact with a fixing terminal; causing a coupling state determination unit to determine that a coupling failure is detected in a case where the movable terminal is not brought into contact with the fixing terminal and the electromagnetic relay is not turned on despite the supplying the first voltage to the exciting coil; and supplying a second voltage higher than the first voltage from a booster circuit to the exciting coil in a case where the coupling state determination unit determines that the coupling failure is detected. The second voltage is generated by boosting the first voltage at the booster circuit.

An aspect of the technology provides a control apparatus for an electromagnetic relay. The control apparatus is configured to control the electromagnetic relay by supplying a voltage to an exciting coil to bring a movable terminal into contact with a fixing terminal. The control apparatus includes a voltage supply circuit, a booster circuit, a temperature sensor, a coupling state determination unit, a freezing state determination unit, and a control unit. The voltage supply circuit is configured to supply a first voltage to the exciting coil of the electromagnetic relay. The booster circuit is configured to boost the voltage to be supplied to the exciting coil from the first voltage to a second voltage higher than the first voltage. The temperature sensor is configured to measure temperatures of the electromagnetic relay at predetermined time intervals and store the temperatures measured. The coupling state determination unit is configured to determine that the coupling failure is detected in a case where the movable terminal is not brought into contact with the fixing terminal and the electromagnetic relay is not turned on despite the supplying the first voltage to the exciting coil. The freezing state determination unit is configured to determine that the electromagnetic relay has a frozen portion in a case where the coupling state determination unit determines that the coupling failure is detected and where a temperature of the electromagnetic relay measured at predetermined time before the supplying the first voltage to the exciting coil is determined to be lower than a predetermined temperature on the basis of data stored in the temperature sensor. The control unit is configured to switch the exciting coil from being supplied with the first voltage from the voltage supply circuit to being supplied with the second voltage from the booster circuit in a case where the coupling state determination unit determines that the coupling failure is detected and where the freezing state determination unit determines that the electromagnetic relay has the frozen portion.

An aspect of the technology provides a control apparatus for an electromagnetic relay. The control apparatus is configured to control the electromagnetic relay by supplying a voltage to an exciting coil to bring a movable terminal into contact with a fixing terminal. The control apparatus includes a voltage supply circuit, a booster circuit, a temperature sensor, and circuitry. The voltage supply circuit is configured to supply a first voltage to the exciting coil of the electromagnetic relay. The booster circuit is configured to boost the voltage to be supplied to the exciting coil from the first voltage to a second voltage. The temperature sensor is configured to measure temperatures of the electromagnetic relay at predetermined time intervals and store the temperatures measured. The circuitry is configured to: determine that a coupling failure is detected in a case where the movable terminal is not brought into contact with the fixing terminal and the electromagnetic relay is not turned on despite the supplying the first voltage to the exciting coil; determine that the electromagnetic relay has a frozen portion in a case where the coupling failure is detected and where a temperature of the electromagnetic relay measured at predetermined time before the supplying the first voltage to the exciting coil is determined to be lower than a predetermined temperature on the basis of data stored in the temperature sensor; and switch the exciting coil from being supplied with the first voltage from the voltage supply circuit to being supplied with the second voltage from the booster circuit in a case where the circuitry determines that the coupling failure is detected and that the electromagnetic relay has the frozen portion.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
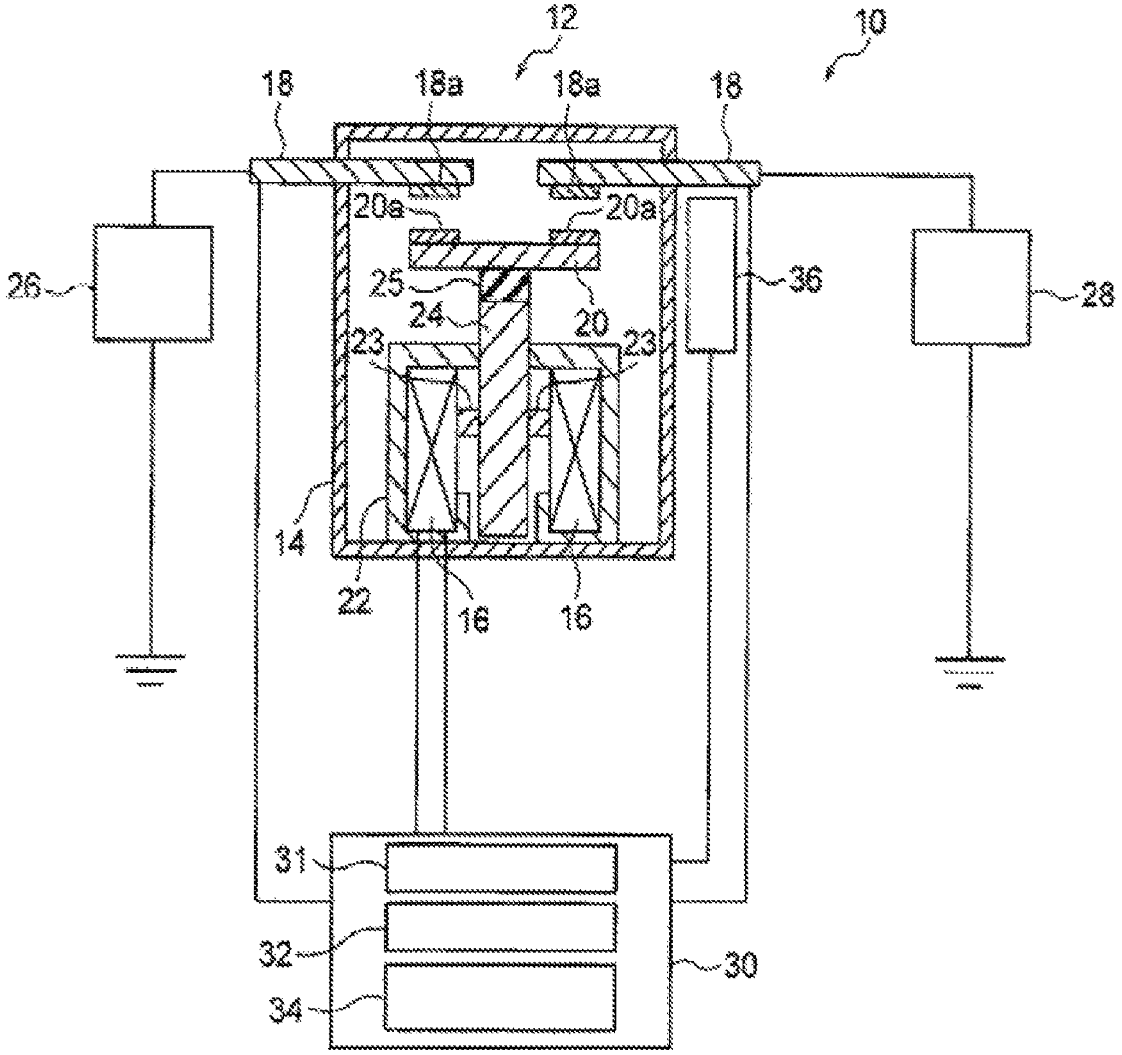
FIG. 1 is a schematic diagram illustrating a configuration of a control apparatus for an electromagnetic relay according to one example embodiment of the technology.

The method disclosed in JP-A No. 2007-165406 needs, for example, an additional motor to generate vibrations, which can lead to an increase in cost for the electromagnetic relay and adverse effect on peripheral components due to the vibrations.

It is desirable to provide a method of controlling an electromagnetic relay and a control apparatus with a simple structure that eliminate a conduction failure at contacts of the electromagnetic relay due to obstacles such as ice particles or dust attached thereto.

In the following, a method of controlling an electromagnetic relay and a control apparatus according to some example embodiments of the technology are described in detail with reference to the accompanying drawings. In the example embodiments described below, the electromagnetic relay may be operated by a direct current of 12 volts. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 illustrates a schematic configuration of a control apparatus 10 for an electromagnetic relay according to an example embodiment of the technology. The control apparatus 10 includes an electromagnetic relay 12. The electromagnetic relay 12 may be disposed between a power source 26, which is illustrated on the left side of FIG. 1, and an electric load 28, which is illustrated on the right side of FIG. 1. The electric load 28 may be, for example, a drive motor that drives a wiper. The electromagnetic relay 12 may supply a voltage to the drive motor and stop supplying a voltage to the drive motor under the control of a control unit 30.

As illustrated in FIG. 1, the electromagnetic relay 12 may include an exciting coil 16 wound, a yoke 22 forming a magnetic circuit upon supplying a voltage to the exciting coil 16, an iron core 24 extending through the yoke 22 along the winding center of the exciting coil 16, a movable terminal 20 fixed to the iron core 24 with an insulating member 25 disposed therebetween, and paired fixing terminals 18 (i.e., a first fixing terminal 18 and a second fixing terminal 18) opposed to the movable terminal 20.

Each of the paired fixing terminals 18 may be partially exposed outside a housing 14. The portion of the first fixing terminal 18 exposed outside the housing 14 may be electrically coupled to the power source 26 with a power line, such as a copper wire. The portion of the second fixing terminal 18 exposed outside the housing 14 may be electrically coupled to the electric load 28 with a power line, such as a copper wire.

When the exciting coil 16 of the electromagnetic relay 12 is not energized, i.e., when the exciting coil 16 is not supplied with a voltage, the movable terminal 20 fixed to the iron core 24 is separated from the fixing terminals 18 by an urging force of an urging member such as a spring (not illustrated), separating contacts **20*a* of the movable terminal 20 from contacts 18*a* of the fixing terminals 18. This electrically separates the electric load 28 from the power source 26 to suspend power supply to the electric load 28**.

In contrast, when the exciting coil 16 is energized, i.e., when the exciting coil 16 is supplied with a voltage via the control unit 30, a magnetic circuit is formed between the yoke 22 and the iron core 24 by a magnetic field generated by an electromagnetic induction effect of the exciting coil 16, exerting a force moving the iron core 24 against the urging force of the urging member. As a result, the iron core 24 moves in an upward direction of FIG. 1.

That is, the movable terminal 20 fixed to the iron core 24 moves toward the paired fixing terminals 18 and comes into contact with the paired fixing terminals 18 so that the contacts **20*a* of the movable terminal 20 come into contact with the respective contacts 18*a* of the fixing terminals 18. This electrically couples the electric load 28 to the power source 26 to supply a voltage to the electric load 28. While the exciting coil 16 is energized, the movement of the iron core 24 may be limited by, for example, a stopper 23 of the iron core 24 abutting on the inner periphery of the yoke 22**.

A temperature detector 36 that measures a temperature of the electromagnetic relay 12 may be disposed outside the housing 14 of the electromagnetic relay 12. The temperature detector 36 measures temperatures of the electromagnetic relay 12 at predetermined time intervals, and stores the temperatures measured. The control unit 30 may refer to the data on the measured temperatures stored in the temperature detector 36. The temperature detector 36 may be disposed at a location other than the location illustrated in FIG. 1. For example, the temperature detector 36 may be disposed on or above the top or on or below the bottom of the housing 14 of the electromagnetic relay 12.

The control unit 30 executes and controls the method of controlling the electromagnetic relay according to the embodiment of the technology. The control unit 30 may be disposed separately from the electromagnetic relay 12. The control unit 30 includes the coupling state determination unit 31, a freezing state determination unit 32, and the booster circuit 34. The control unit 30 sends the electromagnetic relay 12 a relay-on command to turn on the electromagnetic relay 12 (i.e., supplies a voltage to the exciting coil 16), determines whether the fixing terminals 18 are electrically coupled to the movable terminal 20 (i.e., causes the coupling state determination unit 31 to determine whether the fixing terminals 18 are electrically coupled to the movable terminal 20), and switches the voltage to be supplied to the exciting coil 16 from a voltage from an ordinary circuit to a voltage from the booster circuit 34.

The freezing state determination unit 32 may receive the data on the measured temperatures from the temperature detector 36 and store the measured temperatures in a chronological order. The freezing state determination unit 32 determines whether the electromagnetic relay 12 has a frozen portion in accordance with a method described below.

Although described in detail below, the booster circuit 34 may boost an ordinary voltage to be supplied to the exciting coil 16 of the electromagnetic relay 12. That is, the exciting coil 16 may be supplied with the ordinary voltage or the boosted voltage. Switching between the ordinary voltage and the boosted voltage may be controlled by the control unit 30.

Figure 2:
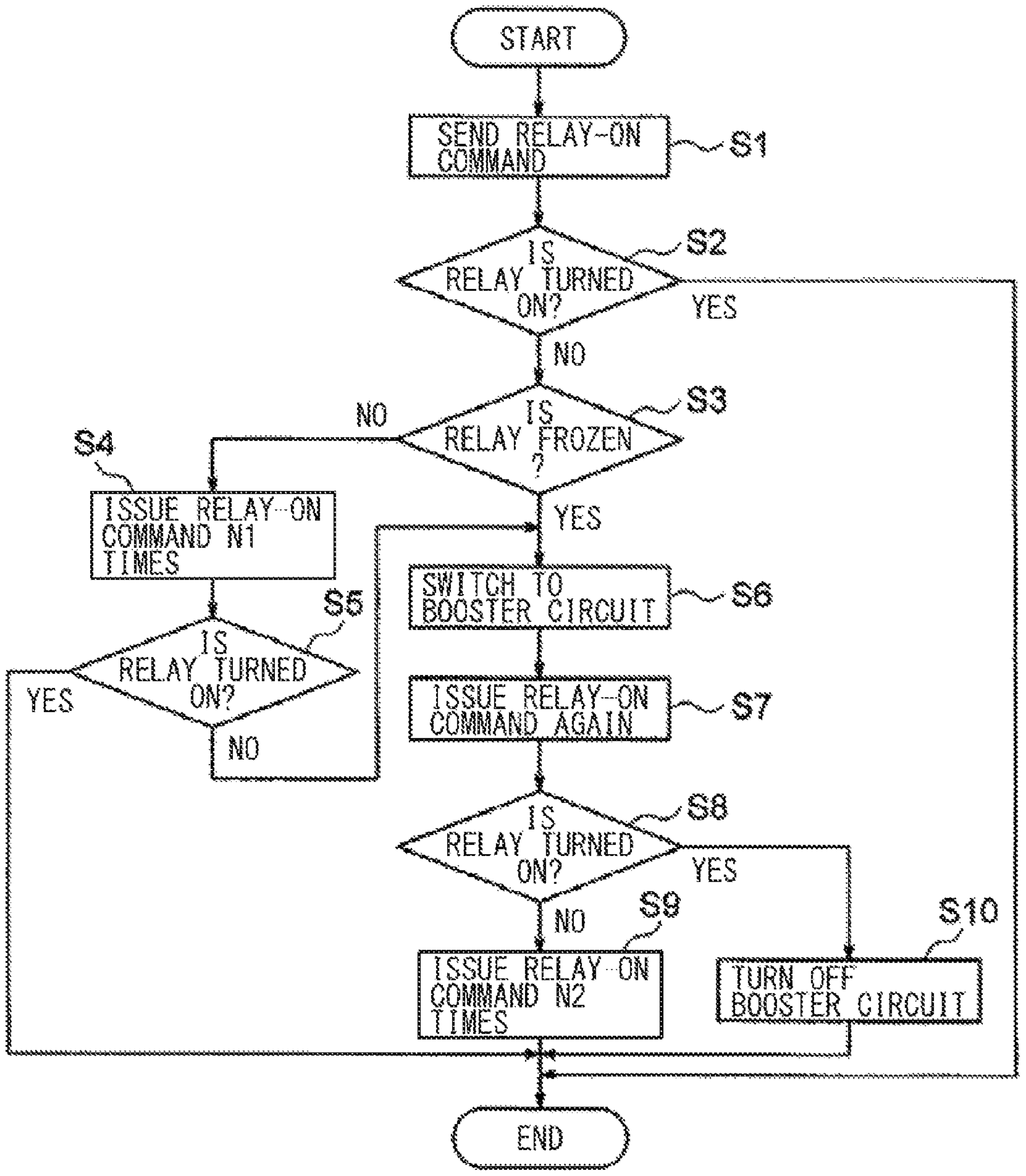
FIG. 2 is a flowchart illustrating a method of controlling the electromagnetic relay according to one example embodiment of the technology.

FIG. 2 is a flowchart illustrating the method of controlling the electromagnetic relay according to an example embodiment of the technology. According to the flowchart illustrated in FIG. 2, the exciting coil 16 may be supplied with the boosted voltage in a case where the coupling state determination unit 31 determines that a coupling failure is detected in the electromagnetic relay 12 and where the freezing state determination unit 32 determines that the electromagnetic relay 12 has a frozen portion.

In response to a switching operation to turn on the wiper performed by a driver who drives a vehicle, for example, the control unit 30 may send the relay-on command to the electromagnetic relay 12 (Step S1). The control unit 30 may cause the coupling state determination unit 31 to determine whether the electromagnetic relay 12 is turned on (Step S2).

If the electromagnetic relay 12 is turned on (Step S2: YES), the flow may end. In contrast, the electromagnetic relay 12 is not turned on (Step S2: NO), the control unit 30 may cause the freezing state determination unit 32 to determine whether the electromagnetic relay 12 has a frozen portion (Step S3).

The freezing state determination unit 32 may determine that the electromagnetic relay 12 has a frozen portion in a case where an average of the temperatures measured within a predetermined time period (e.g., one hour) after the relay-on command is issued first, is determined to be below a freezing temperature on the basis of the data on the measured temperatures stored in the temperature detector 36, for example. Alternatively, the determination may be made on the basis of the gradient of a change in temperature with respect to time, experience, or a certain rule.

If the freezing state determination unit 32 determines that the electromagnetic relay 12 has a frozen portion (Step S3: YES), the control unit 30 switches the exciting coil 16 of the electromagnetic relay 12 from being supplied with the voltage from the ordinary circuit to being supplied with the voltage from the booster circuit 34 (Step S6). If the freezing state determination unit 32 does not determine that the electromagnetic relay 12 has a frozen portion (Step S3: NO), the control unit 30 may repeatedly issue the relay-on command N1 times (Step S4). If the electromagnetic relay 12 is, nevertheless, not turned on (Step S5: NO), the control unit 30 may switch the exciting coil 16 to being supplied with the voltage from the booster circuit 34 (Step S6). If the electromagnetic relay 12 is turned on while the relay-on command is repeatedly issued N1 times (Step S5: YES), the flow may end. The number of times "N1" may be, for example, five. The number of times may be determined as appropriate in accordance with the specifications of the electromagnetic relay 12 or other conditions.

As described above, the control unit 30 may repeatedly issue the relay-on command N1 times rather than immediately switching the exciting coil 16 to being supplied with the voltage from the booster circuit 34. One reason for this is that the conduction failure can be simply due to dust or other debris rather than freezing of the terminals of the electromagnetic relay 12. In this example embodiment, if the electromagnetic relay 12 is not turned on even after the electromagnetic relay 12 is repeatedly supplied with the ordinary voltage N1 times, the relay-on command may be issued using the booster circuit 34.

Figure 3:
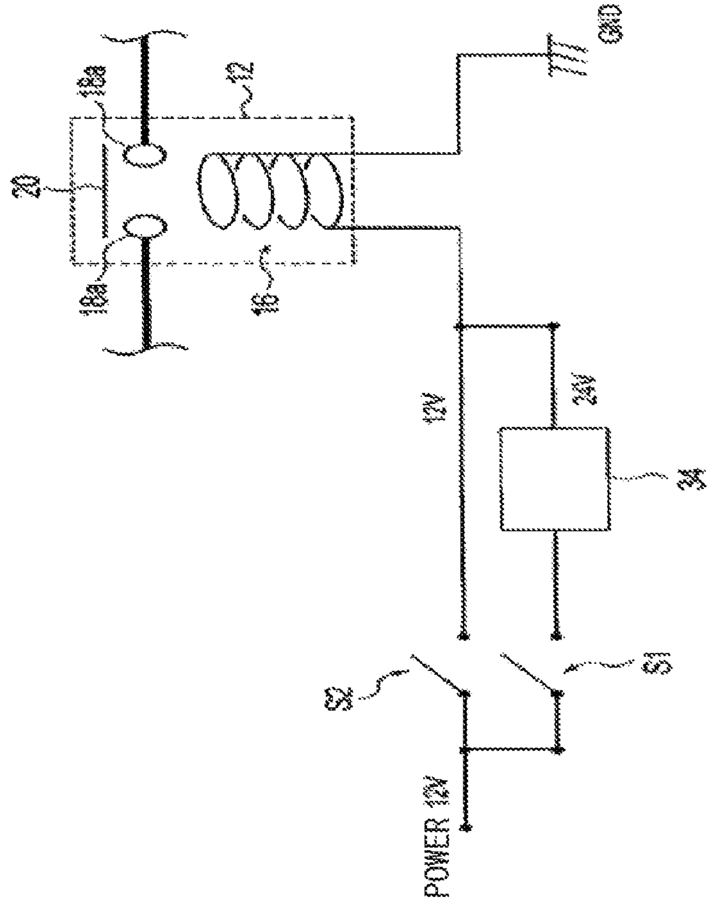
FIG. 3 is an explanatory diagram of a voltage supply circuit that supplies a voltage to an exciting coil according to the method of controlling the electromagnetic relay of one example embodiment of the technology.

FIG. 3 illustrates voltage supply circuitry that supplies voltage to the exciting coil 16 of the electromagnetic relay 12. The voltage supply circuitry may include a voltage supply circuit that supplies an ordinary voltage, i.e., a direct current of 12 volts, from the power source 26 to the exciting coil 16 of the electromagnetic relay 12, and the booster circuit 34. In an ordinary state, a switch S2 may be turned on and a switch S1 may be turned off to supply the direct current of 12 volts to the exciting coil 16. To switch to the booster circuit 34, the switch S2 may be turned off and the switch S1 may be turned on to supply the boosted voltage, e.g., a direct current of 24 volts to the exciting coil 16. Supplying the boosted voltage to the exciting coil 16 moves the movable terminal 20, establishing electric conduction between the contacts 20*a* of the movable terminal 20 and the contacts 18*a* of the fixing terminals 18 unless ice particles or other debris are present between the terminals.

Figure 4:
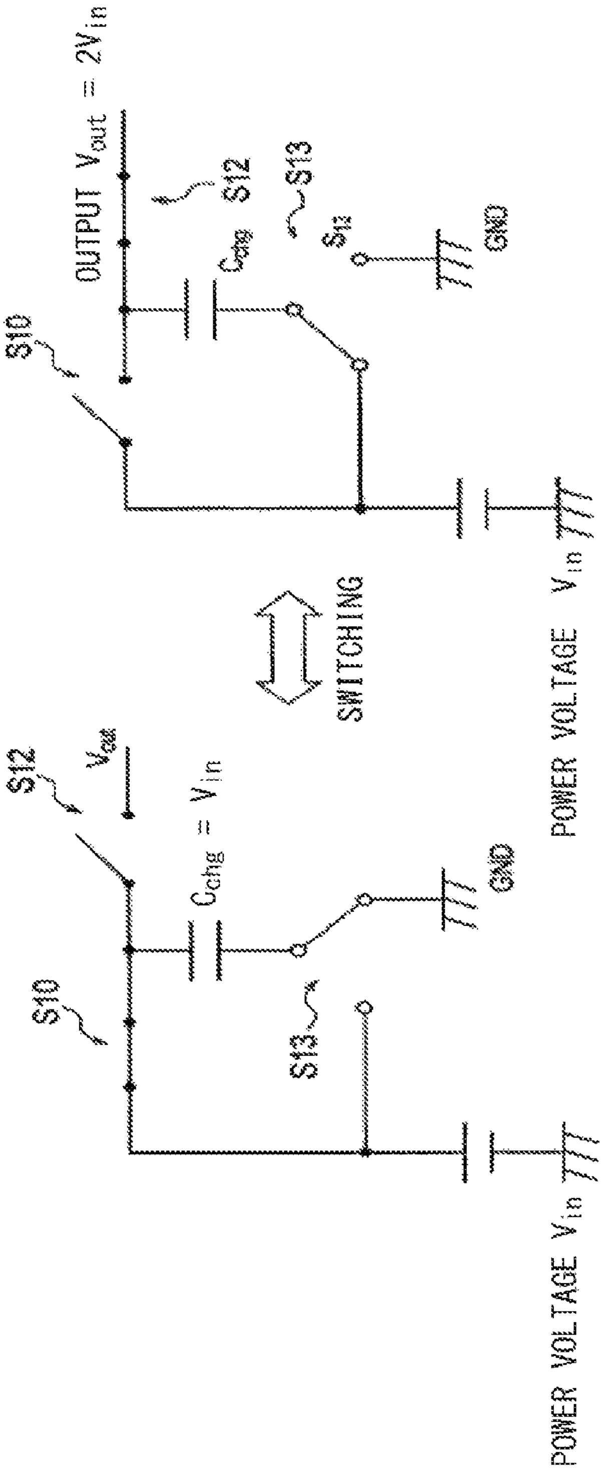
FIG. 4 is an explanatory diagram of a booster circuit illustrated in FIG. 3.

FIG. 4 is a circuit diagram of the booster circuit 34. Although various methods of boosting a voltage have been known, a charge pump circuit may be used in the example embodiment. The booster circuit 34 may include a power source Vin, which may an ordinary power source, for example, a 12-volt DC lead-acid battery. When a switch S10 is turned on and a switch S13 is switched to a ground side, a capacitor Cchg may be charged with the direct current of 12 volts. When a switch S12 is turned on in this state, the exciting coil 16 may be supplied with the ordinary voltage of 12 volts.

When the switch S10 is turned off and the switch S13 is switched to a power source Vin side in this state, the capacitor Cchg having been charged with the direct current of 12 volts may be further charged with a direct current of 12 volts. When the switch S12 is turned on in this state, the exciting coil 16 to which the switch S12 is coupled may be supplied with a voltage 2Vin, which is twice as large as the ordinary voltage of 12 volts.

Returning to the flowchart in FIG. 2, the control unit 30 may switch the exciting coil 16 from being supplied with the ordinary voltage of 12 volts to being supplied with the boosted voltage from the booster circuit 34 (Step S6), and the relay-on command may be issued again (Step S7). If the electromagnetic relay 12 is turned on (Step S8: YES), the booster circuit 34 may be turned off (Step S10). Thereafter, although not illustrated, the exciting coil 16 may be switched back to being supplied with the ordinary voltage of 12 volts, following which the flow may end. If the electromagnetic relay 12 is not turned on (Step S8: NO), the relay-on command may be repeatedly issued N2 times (Step S9). Thereafter, the flow may end regardless of whether or not the electromagnetic relay 12 is turned on. If the electromagnetic relay 12 is turned on while the relay-on command is issued N2 times, although not illustrated, the booster circuit 34 may be turned off, and the exciting coil 15 may be switched back to being supplied with the ordinary voltage, following which the flow may end. If the electromagnetic relay 12 is not turned on despite the relay-on command issued N2 times, the flow may end.

According to the example embodiment described above, the voltage supply from the booster circuit 34 may be stopped after the relay-on command is issued N2 times (e.g., ten times), without repeating the issue of the relay-on command endlessly. This effectively reduces an adverse effect on the service life of the electromagnetic relay 12, preventing the service life of the electromagnetic relay 12 from being shortened and reducing the power consumption of the power source 26.

When the relay-on command is issued by using the booster circuit 34, the magnetic field generated by the electromagnetic induction effect of the exciting coil 16 doubles, and thus the force to move the iron core 24 against the urging force of the urging member doubles, as compared with the case where the relay-on command is issued by using the ordinary circuit. This doubles the kinetic momentum of the movable terminal 20 coming into contact (collision) with the fixing terminals 18. This colliding force breaks the ice attached to the terminals. If the ice is not broken in one collision, the collision may be repeated multiple times to eliminate the freezing state.

In the example embodiment described above, the voltage may be a direct voltage; however, in another example embodiment, the booster circuit 34 may supply an alternating voltage to the exciting coil 16. In the example embodiment in which an alternating voltage is supplied to the exciting coil 16, the iron core 24 vibrates up and down, so that the movable terminal 20 comes into contact with and separate away from the fixing terminal 19 repeatedly. As the alternating voltage increases, the kinetic energy of the iron core 24 increases, resulting in a strong force that brings the movable terminal 20 into contact with and away from the fixing terminals 18. This increases the possibility of eliminating the freezing state.

According to the method of controlling the electromagnetic relay and the control circuit of any of the example embodiments described above, in a case where the electromagnetic relay 12 is not turned on even though the ordinary voltage is supplied to the exciting coil 16, the freezing state determination unit 32 determines whether the electromagnetic relay 12 has a frozen portion. If the freezing state determination unit 32 determines that the electromagnetic relay 12 has a frozen portion, the exciting coil 16 is supplied with the voltage boosted by the booster circuit 34. This generates the strong force that brings the movable terminal 20 into contact (collide) with the fixing terminals 18, increasing the possibility of eliminating the conduction failure. In a case where the electromagnetic relay 12 is not turned on even though the exciting coil 16 is supplied with the voltage boosted by the booster circuit 34, the relay-on command may be intermittently issued a predetermined number of times by using the boosted voltage. If the electromagnetic relay 12 is, nevertheless, not turned on, the flow may end. This reduces an adverse effect on the service life of the electromagnetic relay 12 and helps prevent the power consumption from increasing.

It is to be understood that the technology should not be limited to the example embodiments described above and may be modified in various ways without departing from the gist of the technology. For example, in the example embodiments described above, the booster circuit 34 may be a charge pump circuit that boosts the ordinary direct current of 12 volts to 24 volts; however, the booster circuit 34 should not be limited to the charge pump circuit. The booster circuit 34 may be a DC-DC converter, and the voltage should not be limited to 24 volts.

According to the method of controlling the electromagnetic relay of any of the example embodiments of the technology, the exciting coil is supplied with the voltage boosted by the booster circuit in a case where it is determined that the movable terminal is not appropriately contact with the fixing terminal due to dust, ice, or other debris even though the exciting coil is supplied with the ordinary voltage. Accordingly, in a case where an appropriate movement of the movable terminal is not secured, the moving force of the movable terminal is increased by increasing the voltage supply. Also in a case where the movable terminal is moving but the movement of the movable terminal is insufficient, the speed of the movement of the movable terminal toward the fixing terminal is increased by increasing the voltage supply. Accordingly, the movable terminal comes into contact with an obstacle with an increased colliding force. This colliding force removes dust, ice, or other debris attached to between the movable terminal and the fixing terminal, increasing the possibility of contact between these terminals.

According to the method of controlling the electromagnetic relay of at least one of the example embodiments of the technology, the exciting coil may be supplied with the voltage boosted by the booster circuit in a case where the coupling state determination unit determines that the coupling failure is detected and where the freezing state determination unit determines that the electromagnetic relay has a frozen portion. That is, the exciting coil may be supplied with the voltage boosted by the booster circuit only when it is determined that the electromagnetic relay has a frozen portion. The effect of at least one of the example embodiments of the technology preferably works in a cold climate in which a frozen portion is generated in the electromagnetic relay. Thus, the magnet coil of the electromagnetic relay is prevented from being frequently supplied with the boosted voltage in a case where the electromagnetic relay has no frozen portion. This leads to an efficient use of electric power and reduces an adverse effect on the service life of the electromagnetic relay.

According to the method of controlling the electromagnetic relay of at least one of the example embodiments of the technology, in a case where the coupling failure is detected, i.e., in a case where the electromagnetic relay fails to be turned on, the electromagnetic relay may be intermittently supplied with the boosted voltage a predetermined number of times. This increases the possibility of the electromagnetic relay being turned on. That is, obstacles such as ice, dust, or other debris are effectively removed by the intermittent operations of the electromagnetic relay, i.e., the repeated colliding movements of the movable terminal. When the electromagnetic relay is turned on, the boosted voltage is switched to the ordinary voltage to reduce the power consumption.

According to the control apparatus for the electromagnetic relay of at least one of the example embodiments of the technology, the exciting coil may be supplied with the voltage boosted by the boosted circuit in a case where the freezing state determination unit determines that the electromagnetic relay has a frozen portion in a condition where the coupling failure is detected, i.e., where the electromagnetic relay is not turned on despite the supply of the ordinary voltage to the exciting coil. This supply of the boosted voltage to the exciting coil brings the movable terminal into contact with the fixing terminal with an increased colliding force. The colliding force removes the frozen portion, allowing the electromagnetic relay to be turned on.

According to the method of controlling the electromagnetic relay and the control apparatus of at least one of the example embodiments of the technology, the exciting coil may be switched from being supplied with the ordinary voltage to being supplied with the boosted voltage in a case where electrical coupling of the electromagnetic relay is not established, i.e., where the movable terminal is not appropriately brought into contact with the fixing terminal. This supply of the boosted voltage to the exciting coil increases the speed of the movement of the movable terminal toward the fixing terminal, generating an increased colliding force upon a collision of the movable terminal with the fixing terminal. This colliding force removes dust or ice present between the movable terminal and the fixing terminal to allow these terminals to be coupled to each other. Accordingly, it is possible to provide the electromagnetic relay with high reliability.

One or more of the coupling state determination unit 31, the freezing state determination unit 32, and the control unit 30 in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the coupling state determination unit 31, the freezing state determination unit 32, and the control unit 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the coupling state determination unit 31, the freezing state determination unit 32, and the control unit 30.

The invention claimed is:

1. A method of controlling an electromagnetic relay, the method comprising:

supplying a first voltage to an exciting coil to bring a movable terminal into contact with a fixing terminal;

causing a coupling state determination unit to determine that a coupling failure is detected in a case where the movable terminal is not brought into contact with the fixing terminal and the electromagnetic relay is not turned on despite the supplying the first voltage to the exciting coil; and supplying a second voltage higher than the first voltage from a booster circuit to the exciting coil in a case where the coupling state determination unit determines that the coupling failure is detected, the second voltage being generated by boosting the first voltage at the booster circuit.

2. The method according to claim 1, further comprising:

causing a freezing state determination unit to determine that the electromagnetic relay has a frozen portion in a case where the coupling state determination unit determines that the coupling failure is detected and where a temperature of the electromagnetic relay measured at predetermined time before the supplying the first voltage to the exciting coil is determined to be lower than a predetermined temperature on a basis of data stored in a temperature detector of the electromagnetic relay, the temperature detector being configured to measure temperatures of the electromagnetic relay at predetermined time intervals and store the temperatures measured; and supplying the second voltage from the booster circuit to the exciting coil in a case where the coupling state determination unit determines that the coupling failure is detected and where the freezing state determination unit determines that the electromagnetic relay has the frozen portion.

3. The method according to claim 1, wherein the supplying the second voltage from the booster circuit to the exciting coil is intermittently performed a predetermined number of times, and, in a case where the electromagnetic relay is turned on while the second voltage is supplied to the exciting coil intermittently, a voltage to be supplied to the exciting coil is switched back to the first voltage.

4. The method according to claim 2, wherein the supplying the second voltage from the booster circuit to the exciting coil is intermittently performed a predetermined number of times, and, in a case where the electromagnetic relay is turned on while the second voltage is supplied to the exciting coil intermittently, a voltage to be supplied to the exciting coil is switched back to the first voltage.

5. A control apparatus for an electromagnetic relay, the control apparatus being configured to control the electromagnetic relay by supplying a voltage to an exciting coil to bring a movable terminal into contact with a fixing terminal, the control apparatus comprising:

a voltage supply circuit configured to supply a first voltage to the exciting coil of the electromagnetic relay;

a booster circuit configured to boost the voltage to be supplied to the exciting coil from the first voltage to a second voltage higher than the first voltage;

a temperature detector configured to measure temperatures of the electromagnetic relay at predetermined time intervals and store the temperatures measured;

a coupling state determination unit configured to determine that a coupling failure is detected in a case where the movable terminal is not brought into contact with the fixing terminal and the electromagnetic relay is not turned on despite the supplying the first voltage to the exciting coil;

a freezing state determination unit configured to determine that the electromagnetic relay has a frozen portion in a case where the coupling state determination unit determines that the coupling failure is detected and where a temperature of the electromagnetic relay measured at predetermined time before the supplying the first voltage to the exciting coil is determined to be lower than a predetermined temperature on a basis of data stored in the temperature detector; and a control unit configured to switch the exciting coil from being supplied with the first voltage from the voltage supply circuit to being supplied with the second voltage from the booster circuit in a case where the coupling state determination unit determines that the coupling failure is detected and where the freezing state determination unit determines that the electromagnetic relay has the frozen portion.

6. A control apparatus for an electromagnetic relay, the control apparatus being configured to control the electromagnetic relay by supplying a voltage to an exciting coil to bring a movable terminal into contact with a fixing terminal, the control apparatus comprising:

a voltage supply circuit configured to supply a first voltage to the exciting coil of the electromagnetic relay;

a booster circuit configured to boost the voltage to be supplied to the exciting coil from the first voltage to a second voltage higher than the first voltage;

a temperature sensor configured to measure temperatures of the electromagnetic relay at predetermined time intervals and store the temperatures measured; and circuitry configured to determine that a coupling failure is detected in a case where the movable terminal is not brought into contact with the fixing terminal and the electromagnetic relay is not turned on despite the supplying the first voltage to the exciting coil, determine that the electromagnetic relay has a frozen portion in a case where the coupling failure is detected and where a temperature of the electromagnetic relay measured at predetermined time before the supplying the first voltage to the exciting coil is determined to be lower than a predetermined temperature on a basis of data stored in the temperature sensor, and switch the exciting coil from being supplied with the first voltage from the voltage supply circuit to being supplied with the second voltage from the booster circuit in a case where the circuitry determines that the coupling failure is detected and that the electromagnetic relay has the frozen portion.

* * * * *